(No Model.)

D. SCHMIDT.
FISH SAFE.

No. 265,544. Patented Oct. 3, 1882.

WITNESSES:
Chas. Nida
C. Sedgwick

INVENTOR:
D. Schmidt
BY Munn & Co
ATTORNEYS.

UNITED STATES PATENT OFFICE.

DIEDRICH SCHMIDT, OF NEW YORK, N. Y.

FISH-SAFE.

SPECIFICATION forming part of Letters Patent No. 265,544, dated October 3, 1882.

Application filed July 17, 1882. (No model.)

*To all whom it may concern:*

Be it known that I, DIEDRICH SCHMIDT, of the city, county, and State of New York, have invented a new and Improved Fish-Safe, of which the following is a full, clear, and exact description.

The object of my invention is to provide a new and improved safe in which salted fish can be kept any length of time without losing in weight by the evaporation of the water in the same.

The invention consists in a box provided with a slatted floor for receiving a box containing salted fish, below which slatted floor a water-pan is provided, which provides the box with moisture and prevents the rapid evaporation of the water in the salted fish.

The invention also consists in the combination, with the above box, of a second slatted floor above the first, above which upper floor the sides of the box and the upper door are provided with glass panels.

Reference is to be had to the accompanying drawings, forming part of this specification, in which similar letters of reference indicate corresponding parts in both the figures.

Figure 1:
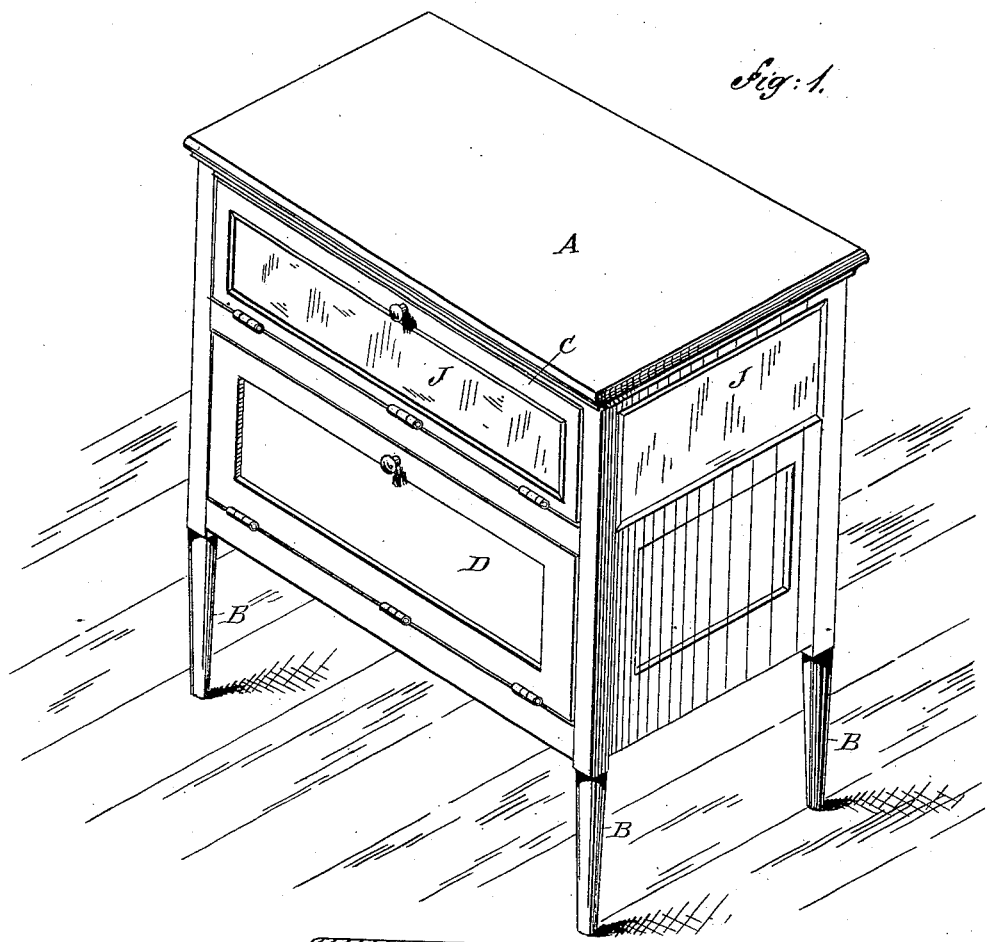
Figure 2:
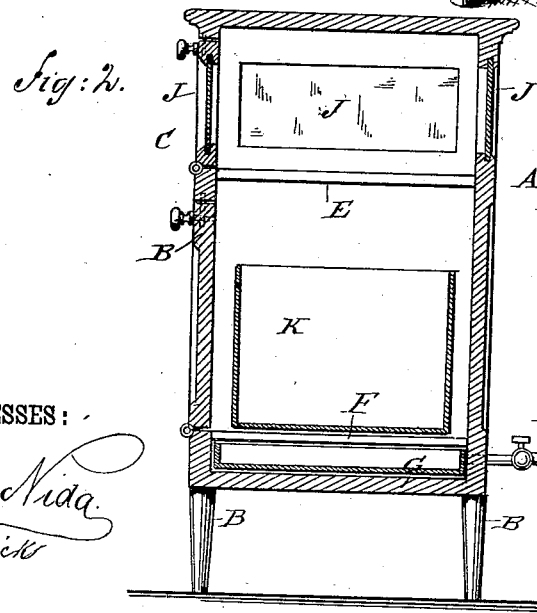

Figure 1 is a perspective view of my improved fish-safe. Fig. 2 is a cross-sectional elevation of the same.

Salted codfish and other salted fish contain a very great quantity of water, and if the fish remains in an open box in a store, &c., for a length of time a part of this water evaporates very rapidly and the fish loses in weight correspondingly. The dealer suffers considerable loss, as the fish weighs less when he sells it than when he bought it, and the fish is not as soft and delicate, as it becomes hard and tenacious by the evaporation of the water. To avoid this evaporation I have invented the fish-safe, which I will now describe.

The zinc-lined box A, supported by legs B, is provided in its front with two sliding or swinging doors, C and D, one above the other, and the lower door, D, is larger than the upper door. A slatted floor, E, extends across the box directly below the bottom of the upper door, and a like slatted floor, F, extends across the box directly below the bottom of the lower door. A flat water-pan, G, rests upon the floor of the box below the lower slatted floor, F, which pan is provided with an outlet-cock, H. The upper door, C, and the upper parts of the sides and back of the box A are constructed with glass panels J. The box may be made more or less ornamental, and the doors may be provided with packing-strips to exclude the air. A box of salt codfish or other salted fish can be placed on the lower slatted floor, and smoked fish are placed on the upper slatted floor, E, and the pan G is filled with water, which provides the interior of the box A with moisture, and thus prevents an evaporation of the water in the fish, so that the same will retain its weight and will remain in good condition, whereby the retail dealer saves considerable in the weight of the fish which is now lost on account of the evaporation of the water in the salted fish and consequent reduction of the weight of such fish. The upper part of the box is provided with glass panels, so that the smoked fish on the upper slatted floor, E, will be exposed to view.

The upper floor, E, can be made solid, in place of being made of slats.

Having thus fully described my invention, I claim as new and desire to secure by Letters Patent—

1. In a fish-safe, the combination, with the box A, of the doors C and D, the slatted floors E and F, and the water-pan G, substantially as herein shown and described, and for the purpose set forth.

2. In a fish-safe, the combination, with the box A, of the doors C and D, the slatted floors E and F, the glass panels J, and the water-pan G, substantially as herein shown and described, and for the purpose set forth.

DIEDRICH SCHMIDT.

Witnesses:
 OSCAR F. GUNZ,
 C. SEDGWICK.